Nov. 18, 1969  J. A. ROYER  3,478,776
PRESSURE REGULATING DEVICE FOR FLUID DISPENSING SYSTEMS
Filed July 18, 1966  2 Sheets-Sheet 1

JOHN A. ROYER
INVENTOR

Huebner & Worrel
ATTORNEYS

Nov. 18, 1969   J. A. ROYER   3,478,776
PRESSURE REGULATING DEVICE FOR FLUID DISPENSING SYSTEMS
Filed July 18, 1966

JOHN A. ROYER
INVENTOR

Huebner & Worrel
ATTORNEYS

United States Patent Office 3,478,776
Patented Nov. 18, 1969

3,478,776
PRESSURE REGULATING DEVICE FOR FLUID
DISPENSING SYSTEMS
John A. Royer, Fresno, Calif., assignor to Buckner
Industries, Inc., a corporation of California
Filed July 18, 1966, Ser. No. 565,898
Int. Cl. F16k 31/12, 31/36
U.S. Cl. 137—491                    2 Claims

ABSTRACT OF THE DISCLOSURE

A device including a housing having an inlet port and an outlet port with a passage therebetween. A diaphragm divides the housing into upper and lower chambers and supports a valve for controlling flow through the passage, the valve having a bore interconnecting the inlet port with the upper chamber. A bypass interconnects the upper and lower chambers and disposed in the bypass is a pressure regulating valve having a fluid metering spool pressed by a compressing spring. Adjusting means extended outwardly from the housing serve to adjust the force exerted by the spring to permit limited opening of the spool.

The present invention relates to a pressure regulating device for fluid dispensing systems and more particularly to such a device which automatically maintains a supply of fluid to the dispensing system at a predetermined constant pressure irrespective of variations within a substantial range in the pressure and volume of fluid discharge by the dispensing system.

Conventional devices for regulating the flow of fluid to a dispensing system are usually manually adjustable to maintain a predetermined maximum pressure of fluid supply to a certain number of discharge outlets or nozzles at a desired volume of flow. If, however, the number of discharge nozzles is increased, the system requires a greater volume of flow at a correspondingly higher pressure. In order to maintain the same discharge pattern of fluid from each nozzle, the regulating devices of the prior art must be manually adjusted to accommodate such increased demand when the increase is above the prior maximum setting. If no adjustment is made, the volume of fluid flow may be reduced to such an extent that no appreciable discharge occurs at the dispensing outlets in view of the inability of the regulating device automatically to open sufficiently to supply the system.

Accordingly, it is an object of the present invention to provide an improved pressure regulating device for fluid dispensing systems.

Another object is to provide such an improved pressure regulating device which is automatically operable through the full range of anticipated fluid pressure and volumetric requirements of the dispensing system.

Another object is to provide a pressure regulating device which automatically maintains such constant pressure in the system irrespective of variations in pressure requirements occurring at the discharge outlets from the system.

Another object is to provide a pressure regulating device which is sensitive to variations in pressure occurring in the fluid supply to the discharge outlets of the system.

Another object is to provide a pressure regulating device which requires substantially no manipulation to maintain such constant fluid pressure in the system.

Other objects and advantages of the present invention will subsequently become more clearly apparent upon reference to the following description in the specification and accompanying drawings.

Figure 1:
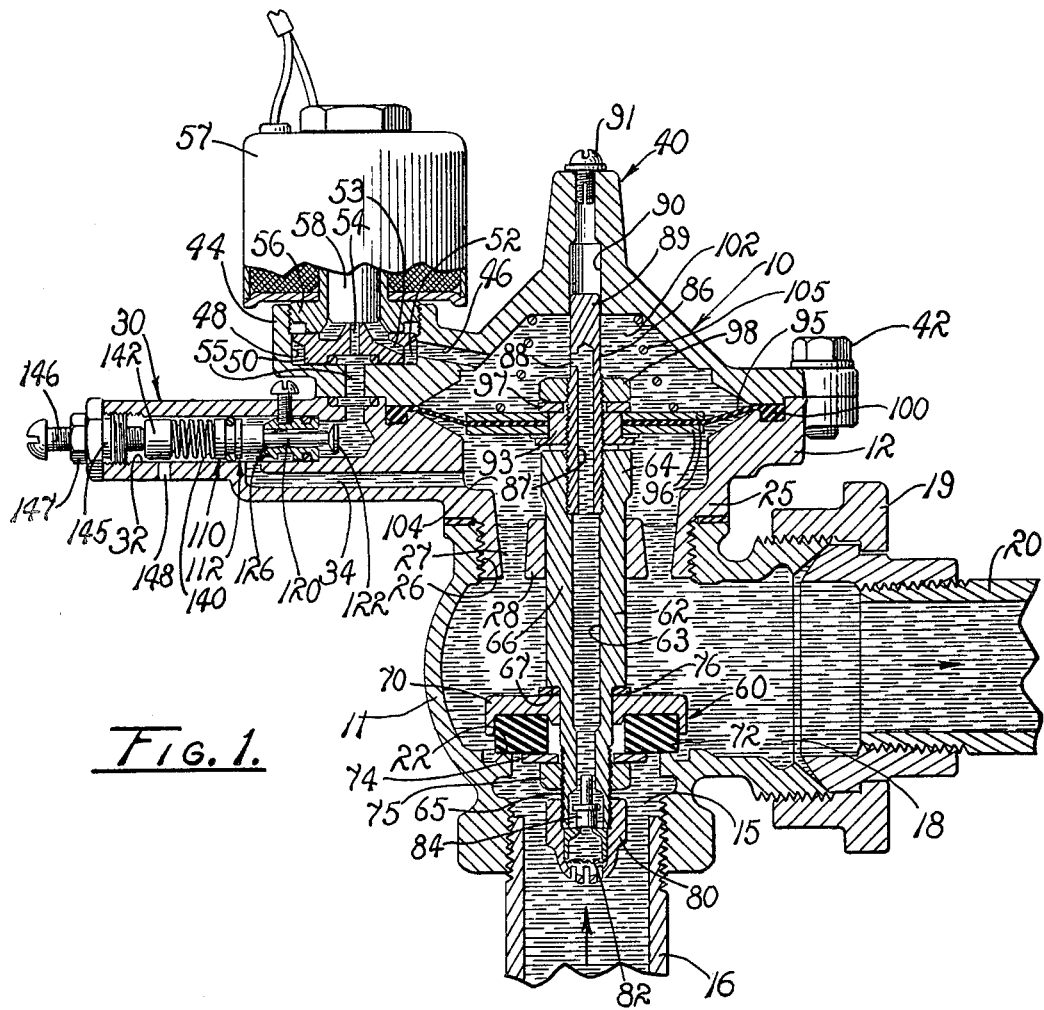
FIG. 1 is a central cross section through the pressure regulating device of the present invention showing the valve disposed in a closed position.

Referring more particularly to the drawings, a pressure regulating device embodying the principles of the present invention provides a housing generally indicated by the reference numeral 10 having a lower body portion 11 and an upper head portion 12. The lower body portion provides an internally screw-threaded inlet port 15 which screw-threadably receives an elongated supply conduit 16 which is connected to a source of fluid under pressure, not shown. The lower body portion further includes an externally screw-threaded outlet port 18 which is adapted to receive in fluid sealing relation a union fitting 19 mounted on the end of a fluid discharge conduit 20. The discharge conduit is connected to a dispensing system, not shown, having a plurality of discharge outlets such as a sprinkler system. An annular valve seat 22 is provided within the body portion 11 of the housing inwardly adjacent to the inlet port 15.

The head portion 12 of the housing 10 provides a lower, externally screw-threaded, nipple portion 25 screw-threadably received within an internally threaded bore 26 in the body portion 11 of the housing in opposed relation to the inlet port 15. A plurality of spaced web members 27 support an annular stem guide 28 within the bore in concentric relation to an axis common with the inlet port 15. The head portion 12 of the housing provides a radially outwardly extended substantially cylindrical regulator housing 30 having an elongated bore 32 and a lower auxiliary fluid discharge passage 34 communicating with the interior of the lower body portion 11 of the housing 10 through the nipple 25.

Figure 2:
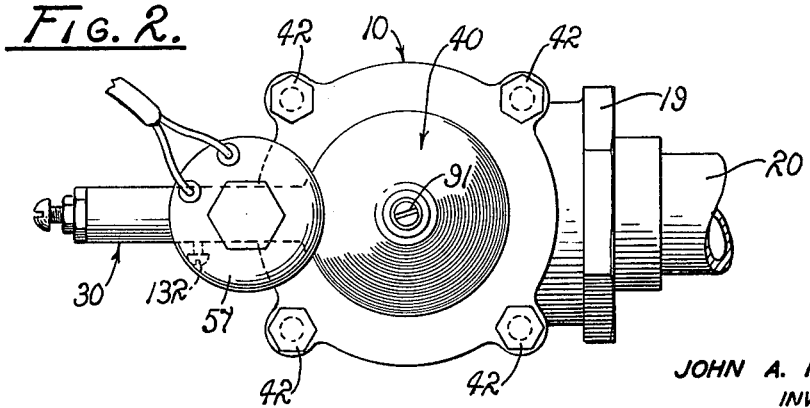
FIG. 2 is a top plan view shown on a somewhat reduced scale from that of FIG. 1.

A separable cap or bonnet 40 is mounted on the head portion 12 of the housing 10 by a plurality of cap screws, 42, as shown in FIG. 2. The bonnet includes a circular solenoid supporting boss 44 disposed above the regulator housing 30. A passage 46 is provided in the bonnet in communicating relation between the interior of the bonnet and a circular cavity 48 within the boss 44. A circular plug or disc 50 is disposed within the cavity and provides an annular passage 52, an upwardly inclined hole 53 and a substantially upright concentric bore 54. The passage 52 and the inclined hole 53 are disposed in communicating relation with the passage 46 in the bonnet, and the bore 54 is aligned with the interior of the bore 32 in the regulator housing by way of a connecting passage 55. The cavity 48 provides internal screw threads which screw-threadably receive the inner mounting end 56 of an electrically operated solenoid 57. The solenoid has a reciprocable plunger 58 which, as shown in FIG. 1, is normally positioned in blocking relation between the inclined hole 53 and the bore 54 in the disc 50.

A control valve 60 is disposed within the housing 10 in opening and closing relation to the inlet port 15 in the body portion 11. The valve provides an elongated hollow stem 62 having a passage 63 formed therethrough between an upper internally screw-threaded end 64 and a lower externally screw-threaded end 65. The stem provides an intermediate portion 66 which is axially slidably disposed through the guide 28 with the lower end being of a somewhat reduced diameter to form an annular shoulder 67. A washer constraining disc 70 is received on the lower end of the stem and receives an annular seal washer 72 of a suitable compressible material such as composition rubber or the like. A seal washer is held in place by a washer 74 and lock nut 75 in stacked relation against an upper washer 76 against the shoulder. A slotted crown nut 80 is screw-threadably received on the lower end 65 of the stem 62 in constraining relation to a screen disc 82 and a plunger 84.

The upper end 64 of the valve stem 62 screw-threadably mounts an elongated extension rod 86 which provides an axial bore 87 terminating short of the upper end of the rod. The bore is extended radially outwardly of the rod by a passage 88. The rod has a substantially solid upper end 89 which is piloted within a bore 90 in the bonnet 40. A slotted screw 91 is screw-threadably received within a reduced diameter outer portion of the bore 90 to serve as a bleed valve for any fluid which might become trapped within the bore.

A diaphragm mounting sleeve 93 is screw-threadably mounted on the rod 86 adjacent to the upper end 64 of the stem 62. A circular diaphragm 95 of resiliently flexible material such as rubber, plastic or the like is mounted about the sleeve by a pair of upper and lower diaphragm discs 96 in stacked assembly by a reduced diameter washer 97 and lock nut 98. The diaphragm 95 has an enlarged peripheral sealing edge 100 which is disposed in an annular groove in the head portion 12 of the housing and is tightly constrained in fluid sealing relation therein by the bonnet 40.

The diaphragm 95 divides the head portion 12 of the housing 10 into an upper compartment 102 and a lower compartment 104, the latter of which communicates with the interior of the body portion 11 of the housing through the spaces between the web members 27 spaced about and supporting the stem guide 28. A compression spring 105 is disposed within the upper compartment 102 between the upper diaphragm disc 96 and the bonnet continually to urge the diaphragm 95 and the stem 62 downwardly with the seal washer 72 pressed tightly in fluid sealing relation against the valve seat 22 of the inlet port 15.

A fluid pressure regulating valve 110 is disposed in the regulator housing 30 of the head portion 12 of the housing 10.

Figure 3:
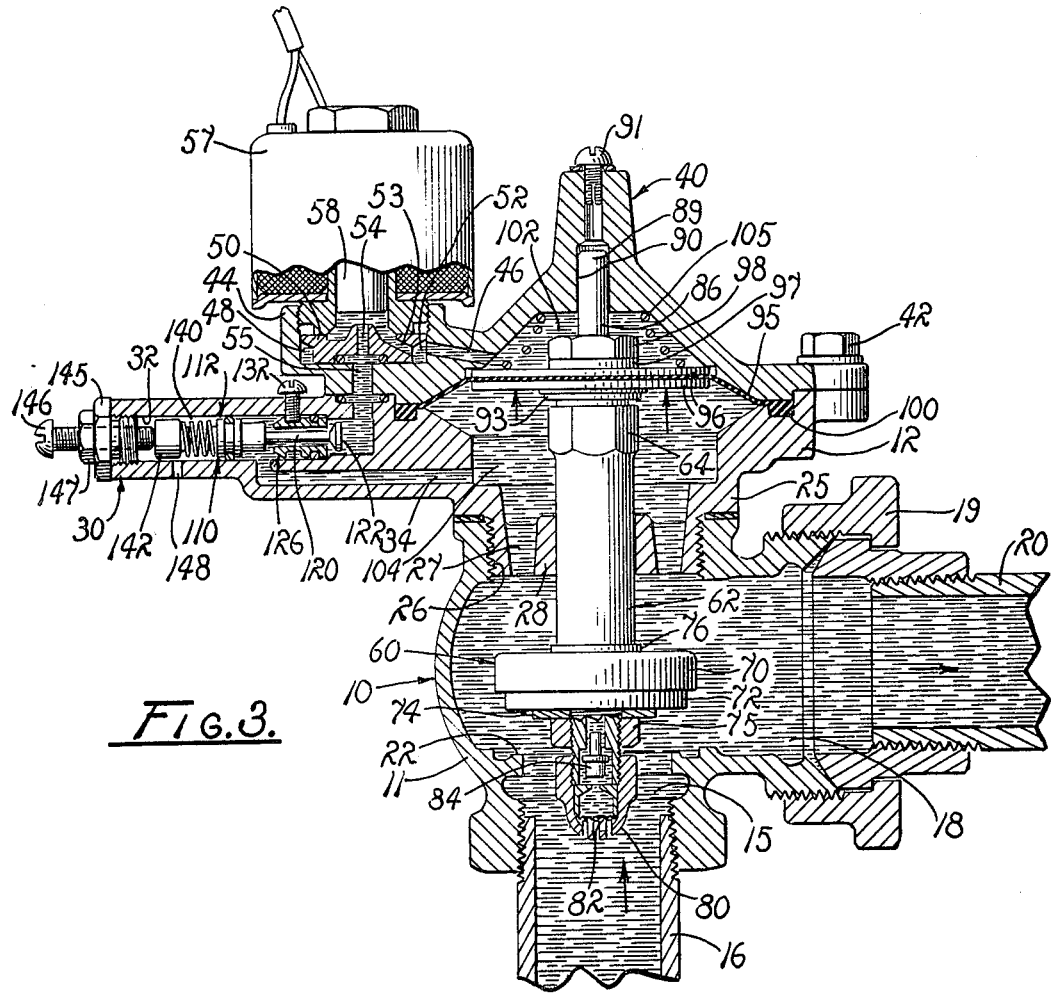
FIG. 3 is a central section of the device of the present invention similar to FIG. 1 but showing the valve in an open operating position.
Figure 4:
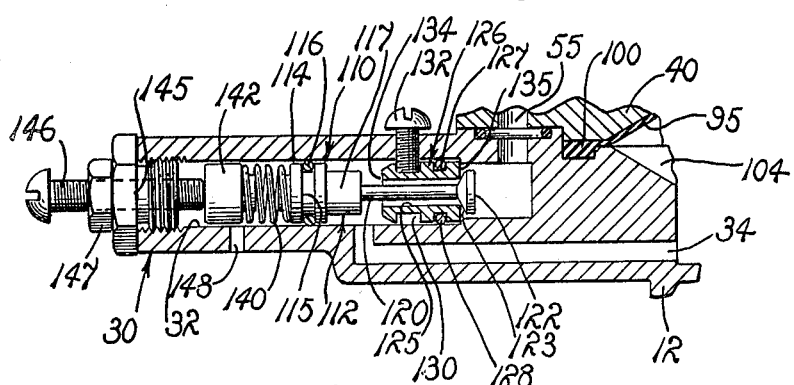
FIG. 4 is a fragmentary enlarged sectional view of a portion of FIGS. 1 and 3 showing the pressure regulating valve in one phase of operation.

As also shown in FIGS. 3 and 4, the regulating valve provides an elongated spool 112 having a land portion 114 slidably fitted to the bore 32 in the housing. The land portion has an annular groove 115 within which is disposed an O-ring seal 116 in axially sliding sealing relation against the bore. The spool includes a shoulder portion 117 of reduced diameter having an elongated rod end 120 endwardly extended therefrom which terminates in a flanged end 122 of somewhat enlarged diameter having an inner tapered shoulder 123. The rod 120 is extended through a bore 125 of a somewhat larger diameter than the rod within a valve sleeve 126. The valve sleeve has a groove 127 mounting an annular O-ring 128 in sealing relation with the bore 32 and an annular groove 130 to receive a lock screw 132 screw-threadably extended through the housing for axially constraining the valve sleeve within the bore. The valve sleeve further includes a stop end 134 for engaging the shoulder portion 117 of the spool 112 and an opposite chamfered fluid metering seat end 135. A compression spring 140 is disposed within the bore 32 against the valve spool 112 and a spring retainer 142 slidably disposed in the bore. A plug 145 is screw-threadably mounted in the outer end of the regulator housing 30 and has an elongated adjusting screw 146 screw-threadably disposed therethrough for engagement with the spring retainer 142. A lock nut 147 is mounted on the adjusting screw for constraining the same in a variety of axially adjusted positions for varying the pre-load on the spring 140. A passage 148 is formed in the regulator housing to vent the portion of the bore 32 between the valve spool 112 and the spring retainer 142.

OPERATION

The operation of the described embodiment of the subject invention is believed to be clearly apparent and is briefly summarized at this point. The condition of the pressure regulating device prior to operation is shown in FIG. 1 with the seal washer 72 of the valve 60 disposed in seated closing relation on the valve seat 22. In such condition, fluid under pressure through the supply conduit 16 is directed through the slots in the crown nut 80, the screen disc 82, past the plunger 84, and upwardly through the passage 63 in the valve stem 62. Such flow continues through the bore 87 in the extension rod 86 in the stem and outwardly thereof through the radial passage 88 and into the upper compartment 102 in the head portion 12 of the housing 10. With the plunger 58 of the solenoid 57 in its closed position of FIG. 1, the pressure in the upper compartment 102 and the pressure in the supply conduit 16 are equal so that the diaphragm spring 105 is effective to maintain the valve in its closed position with respect to the inlet port 15. Inasmuch as there is no fluid in the passage 55 downstream of the solenoid valve 57, the spring 140 of the regulator valve 110 is extended by the pre-load afforded by adjustment of the adjusting screw 146. Such extension of the spring forces the valve spool 112 to the right, as viewed in FIG. 1, with its shoulder portion 117 abutting the stop end 134 of the valve sleeve 126. In such position, the flanged end 122 of the rod 120 is spaced from the seat end 135 of the valve sleeve in a fully opened, non-regulating position.

When it is desired to provide a flow of fluid under pressure to the fluid dispensing system, not shown, through the outlet port 18 and discharge conduit 20, the solenoid valve 57 is actuated in the usual manner. Such action lifts the plunger 58 in opening relation between the inclined hole 53 and the concentric bore 54 so as to communicate the upper compartment 102 of the head portion 12 of the housing 10 with the bore 32 in the regulating housing 30, as shown in FIG. 3. This enables the fluid pressure behind the diaphragm 95 to be relieved by discharge of such fluid through the regulating valve 110 and outwardly from the bore 32 through the discharge passage 34. Such discharged fluid is directed into the lower body portion 11 of the housing for discharge through the outlet port 18 with the main flow of fluid between the inlet and outlet ports.

The amount of opening of the valve 60 is determined by the setting of the adjusting screw 146 of the regulator valve 110. The fluid pressure in the upper compartment 102 above the diaphragm 95 exerts a force against the flanged end 122 and the shoulder portion 117 of the valve spool 112, moving it to the left, as viewed in FIG. 3, against the force of the spring 140. Such flow is continuous by virtue of the passages 63 and 88 in the valve stem 62 and extension rod 86. The flow from the upper compartment 102 is metered between the tapered shoulder 123 of the flanged end of the rod 120 and the seat end 135 of the valve sleeve 126. If the pressure of the fluid in the upper compartment 102 increases, such increase is imposed against the valve spool 112 so as further to shift the spool to the left and further to restrict the discharge of fluid from the regulating housing 30, as shown in FIG. 4. As a result, the higher pressure in the upper compartment tends to force the valve 60 downwardly to restrict the flow of fluid through the inlet port 15 for lowering the pressure of fluid in the outlet port 18 so as to maintain the desired pressure and flow to the fluid dispensing system.

If a pressure reduction occurs in the discharge conduit 20 from the outlet port 18, such reduced pressure is sensed by the regulator valve 110 incidental to the reduction in the fluid force imposed against the valve spool 112 through the discharge passage 34. Accordingly, the valve spool immediately shifts to the right, as viewed in FIG. 3, to provide a greater spacing between the tapered shoulder 123 of the rod 120 and the seat end 135 of the sleeve 126. This permits a greater discharge of fluid from the upper compartment 102 to permit the fluid pressure within the lower body portion 11 of the housing to force the diaphragm 95 upwardly to provide a greater valve opening between the seal washer 72 and the valve seat 22. The valve spool 112 of the regulator valve 110 is thereby always sensitive to the pressure of fluid within the outlet port 18 through the discharge passage 34 from the bore 32 in the regulator housing 30 so that upon a pressure increase in the outlet port the regulator valve shifts to the left to cause a corresponding pressure increase in the upper chamber 102 of the head portion 12 of the housing to provide a greater downward force on the diaphragm 95, tending to close the valve 60. Upon a decrease in pressure in the outlet port, the regulating valve is permitted to shift to the right, as viewed in FIG. 3, to permit an increase in the discharge of fluid from the upper compartment 102 to permit the higher pressure in the inlet port to raise the valve to permit a greater flow of fluid between the inlet and outlet ports. Accordingly, the pressure above and below the diaphragm is equalized to maintain the pressure at the outlet port substantially constant as determined by the setting of the regulator valve 110.

In view of the foregoing, it is readily apparent that the structure of the present invention provides an improved pressure regulating device for fluid dispensing systems which is effective to maintain a predetermined constant pressure to the system irrespective of pressure variations within the system within a substantial range. It is significant that the operation of the pressure regulating device of the present invention is completely automatic within the permissible range of each initial setting of the regulating valve and thereafter requires no manipulation.

Having described my invention, what I claim as new and desire to secure by Letters Patent is:

1. In a fluid control device having a housing adapted for connection to a source of fluid under pressure, valve means slidably mounted in fluid flow controlling relation within the housing and being subject to the forces of fluid pressure from such a source, pressure sensitive actating means in the housing controllably connected to said valve means, said valve means being adapted continuously to direct a flow of pilot fluid from the source against said actuating means to provide a pressure force acting in a direction opposing the force of fluid pressure from the source against said valve means and in balancing relation, biasing means in the housing engaging said actuating means to impose an additional force against said actuating means in the same direction as that provided by the pilot fluid pressure normally to urge the valve means to a position blocking the flow of fluid from the source through the housing, a bypass for discharge of the pilot fluid, and retractable blocking means in said bypass; pressure regulating means selectively adjustable to control discharge of the pilot fluid to provide a pressure differential within the housing to permit opening of the valve means by the force of fluid pressure from the source against the valve means, said pressure regulating means comprising a valve sleeve disposed within said bypass having a stop end and an opposite seat end; an elongated valve spool having a land portion slidable within said bypass, a shoulder and an elongated reduced diameter rod end terminating in an enlarged diameter annular flange; adjusting means normally to urge said shoulder of the valve spool against the stop end of the sleeve in closing relation to said bypass and accommodating movement of the valve spool in the opposite direction to retract said shoulder from the stop end and to move said flange of the rod end toward said seat end to meter the discharge of fluid from said upper chamber incident to the retraction of said blocking means from the bypass.

2. A pressure regulating device comprising a housing having an inlet port adapted for connection to a source of fluid under pressure and an outlet port, said ports being interconnected by a passage; a control valve mounted for reciprocal movement in the housing having a seal portion disposed in opening and closing relation relative to said passage; a diaphragm of resiliently flexible material controllably connected in supporting relation to said valve for effecting said reciprocal movement thereof within the housing and dividing the housing into upper and lower chambers, said valve including a bore interconnecting said inlet port with said upper chamber to direct said fluid under pressure from the source into said upper chamber in balancing relation with fluid under pressure from the source against said seal portion of the valve; a compression spring disposed within said upper chamber providing an additional force against said diaphragm normally to maintain said seal portion of the valve in closing relation to said passage between the ports; a bypass passage in the housing around said diaphragm in connecting relation between said upper and lower chambers; a pressure regulating valve disposed within said bypass passage having a fluid metering spool member sensitive to fluctuations in the fluid pressure within said upper and lower chambers to control the discharge of fluid from the upper chamber to the lower chamber controllably to reduce the fluid pressure in said upper chamber permitting opening of the seal portion of the control valve relative to said inlet port; an electrically energized solenoid valve having a plunger selectively extendable in closing relation to said bypass passage in the housing between said upper chamber and said pressure regulating valve, said pressure regulating valve including a compression spring positionable against said spool member normally to dispose the spool member in blocking relation to the flow of fluid through said bypass passage; and adjusting means extends outwardly from the housing being manipulatable to adjust the force exerted by the spring against said spool member to permit limited opening of the spool member for metering of fluid through the pressure regulating valve incident to the actuation of said solenoid valve to a position retracting said plunger from the bypass passage.

References Cited

UNITED STATES PATENTS

| 1,724,891 | 8/1929 | Anderson | 137—489 XR |
| 2,235,304 | 3/1941 | Toussaint | 137—488 XR |
| 2,312,815 | 3/1943 | Harvey | 137—489 |
| 2,573,369 | 10/1951 | Snoddy | 251—46 XR |
| 3,126,911 | 3/1964 | Galley | 137—495 |
| 3,180,355 | 4/1965 | Long | 137—491 |
| 3,367,621 | 2/1968 | Griswold | 251—46 XR |
| 2,359,111 | 9/1944 | Hughes | 137—505.41 XR |
| 2,591,407 | 4/1952 | Cornelius | 137—505.41 |
| 2,618,908 | 11/1952 | Salter et al. | 137—505.41 XR |

FOREIGN PATENTS

| 1,181,380 | 8/1957 | France. |

M. CARY NELSON, Primary Examiner

R. J. MILLER, Assistant Examiner

U.S. Cl. X.R.

137—495, 505.41